United States Patent Office 2,900,354
Patented Aug. 18, 1959

2,900,354

PIGMENTED OIL-IN-WATER EMULSION TEXTILE DECORATING COMPOSITIONS YIELDING IMPROVED RESISTANCE TO ABRASIVE LAUNDERING

Laszlo Auer, South Orange, and Leslie L. Balassa, Madison, N.J., assignors, by mesne assignments, to J. R. Geigy, S.A., Basel, Switzerland, a corporation of Switzerland No Drawing. Application February 3, 1955
Serial No. 486,035

18 Claims. (Cl. 260—21)

This invention relates to textile decorating compositions which are oil-in-water emulsions. The invention produces decorated textiles improved resistance to wet abrasion such as encountered in severe hand laundering or when using a washboard or other appliances that cause severe abrasion during laundering.

Conventional pigmented oil-in-water emulsions will yield prints, which when properly after-treated by conventional textile printing plant equipment, will withstand repeated laundering in washing machines but do not withstand more severe types of laundering, such as using a washboard and scrubbing with stiff-bristled brushes or rubbing in between the hands in the presence of detergents in the wash liquor. This invention produces results which withstand the latter types of laundering.

Present day pigment printing is carried out by utilizing the following ingredients as components of the print paste used:

(1) A pigment color concentrate which contains the pigment properly dispersed and may contain part of the resin binder emulsion and also contains surface active agents such as pigment dispersing agents and/or emulsifying agents and also may contain protective colloids;

(2) A resin binder emulsion, which may be partly or fully present in the color concentrate or may be added partly or fully to the print paste when that is prepared. The binder emulsion contains resins which may be classified into three types:

A. Fatty acid ester-containing resins, herein referred to as "ester resins,"

B. Elastomers of rubbery nature, usually synthetic rubbers of various kinds, herein called "elastomers,"

C. Thermosetting amino-aldehyde resins, such as urea aldehyde, or melamine-aldehyde resins, which are alkylated and are organic solvent-soluble, herein called "organic solvent-soluble amino-aldehyde resins." These resins are water-immiscible.

(3) A clear extender emulsion, used to regulate the color strength and provide a medium which imparts printing qualities to the print paste. They consist of water, a protective colloid such as, for instance, methylcellulose, a water-insoluble hydrocarbon solvent, such as mineral spirits or xylol and may contain surface active agents such as emulsifying agents, resins in emulsified form and auxiliary materials required for proper printing properties.

The color concentrates may contain pigment content ranging from about 4½% to about 40%; resin content ranging from about 6% to about 20.5%; protective colloid content ranging from about 1% to about 5.5%; and the combined total weight of pigment dispersing agent and emulsifying agent ranging from about 1.6% to about 7.5%, all these percents being by weight and being based on the total weight of the color concentrate. In a conventional method of printing, such color concentrates may be employed in a print paste according to the following formulation:

100 weight parts color concentrate
50 to 75 weight parts binder emulsion of Example 1 herein
325 or more weight parts clear extender emulsion such as described in Example 2 herein.

The color strength is regulated in this type of printing by the amount of clear extender emulsion present in the print paste, in addition to the color concentrate and binder emulsion.

The improvement of the instant invention over the prior art herein referred to is achieved primarily by increasing the quantity of organic solvent-soluble amino-aldehyde resin in the total binder. The proper percentage range of this amino-aldehyde resin in the total binder is from about 18% to about 35%. All percents and parts herein, except if otherwise specified are percents by weight. Advantageously the quantity of the organic solvent-soluble amino-aldehyde resin in the total print paste is increased to the range from about 0.60% to about 4%, depending on the shade (pigment used) and ultimate color strength of the print paste.

Further advantage is found in the use of clear extender emulsions in which the total non-volatile content is increased to the range of from about 3.5% to about 11%, which compares with 0.95% total non-volatile content of the clear extender emulsion of Example 2 herein. In 100 parts of non-volatile resin binder content, clear extender emulsions of the present invention contain preferably a range of ester resins from about 17% to about 37%, elastomer from about 37% to about 57% and an organic solvent-soluble amino-aldehyde resin from about 20% to about 31%. In the extender emulsions of this invention, the ester resin preferably is from about 0.60% to about 3.55%, the elastomer from about 1.25% to about 6.30% and the amino-aldehyde resin from about 0.70% to about 3.45%, based upon 100 parts of clear extender emulsion.

A further improvement is achieved by increasing the total binder resin solids in the print paste. To illustrate that point, we have to consider the pigment color concentrate component content of the print paste. When the pigment color concentrate component content of the print paste is about 20%, the binder resin solids (non-volatile) in the print paste is from about 7.5% to about 15%. When the pigment color concentrate component content of the print paste e.g. is about 2%, the total binder resin solids in the print paste is increased to the range of from about 3.5% to about 11%. When the pigment color concentrate component content of the print paste e.g. is 1%, the total binder resin solids in the print paste ranges from about 3.5% to about 11%. In these print pastes for every one weight part of pigment there is present a binder non-volatile content of at least about one weight part if the pigment is an inorganic pigment and at least about two weight parts if the pigment is an organic pigment.

According to this invention, catalyst is advantageously present in the print paste, which may be either an added catalyst, such as ammonium tartrate, ammonium glycolate, ammonium lactate, ammonium benzoate, ammonium sulfate, ammonium nitrate, ammonium phosphate, or which may be a so called "built in" catalyst, which is a surface active agent, which during the after-treatment of the decorated fabric liberates acid: acting as a catalyst.

Addition may advantageously be made of a small quantity of a water-soluble amino-aldehyde resin, which according to the present invention acts as a sensitizer and accelerator in the system and is usually present in small quantities such as from about 0.2 weight parts to about 1 weight part of non-volatile water-soluble amino-aldehyde resin for every one weight part of dry pigment present in the print paste. In the preferred range, these weight parts do not exceed 0.6 wt. part.

Whereas acid agers and vat agers sometimes achieve proper fixation of resin bonded pigment prints, in the majority of cases they are less effective in producing ultimate fixation and setting of the prints than high temperature curing. According to this invention, the presence of catalysts and of the water-soluble amino-aldehyde resins is particularly useful to achieve the improved abrasion resistance to severe laundering, when the pigment printed fabric has been after-treated by the acid aging or vat aging process.

One of the common drawbacks of resin bonded pigment printing is the so-called "crocking" which means the marking off onto a clear white fabric when said fabric is rubbed against the printed surface. If the fabric is dry, the fastness measured is called resistance to dry crocking and if the fabric is wetted with moisture, the resistance is called resistance to wet crocking. The Technical Manual and Year Book for 1954 of the American Association of Textile Chemists and Colorists (A.A.T.C.C.) describes the procedure for measuring dry crock and wet crock on pages 104–5: "Colorfastness to rubbing (crocking) Standard Test Method 8–52." Further improvement achieved in the instant invention in such that it will also result in improved resistance to dry crock and wet crock.

densation products of bis-phenol and epichlorhydrin, esterified with fatty acids, such as dehydrated castor oil fatty acids or mixtures of the fatty acids of soyabean oil and oiticica oil. Such esters may be further modified by styrenating them.

A few examples are given of commercially manufactured resins useful in the instant process:

(1) Epichlorhydrin and bis-phenol condensation product (alcohol): Epon 1004. Dehydrated castor oil fatty acid ester of Epon 1004: Epitex 120. Epon 1004 is a condensation product of epichlorhydrin with p'-p-dehydroxy-diphenyldimethylmethane as described in the Paint, Oil & Chemical Review, November 9, 1950 issue, starting on page 15 under the title of Epon Resins, New Film Formers. (See also U.S. Patent No. 2,681,322, column 10 line 44 on, and column 15, lines 37–44.)

(2) Styrenated alkyd: Styresol 4250.

(3) Phthalic anhydride-free styrenated alkyd: Soya fatty acid ester of carbic anhydride (bicyclo 2-2-1 cycloheptane delta 5 dicarboxylic anhydride 2, 3) and glycerine (co-ester of fatty acids and anhydride), styrenated, BJS 502, BJS 153 and BJS 155 resins. Polystyrene content 25 to 75%.

(4) Pentaerythritol-glycerin mixed esters of maleic anhydride treated fatty acids: Esskol, linseed oil base.

(5) Styrenated soyabean oil: Keltrol 60.

(6) Pentaerythritol alkyd resins. Constants of 5 such alkyds are given here below:

|  | Resin A | Resin B | Resin C | Resin D | Resin E |
| --- | --- | --- | --- | --- | --- |
| Non-Volatile Content | 50% | 65% | 50% | 70% | 50%. |
| Solvent | Min. Sp. | Min. Sp. | Min. Sp. | Min. Sp. | Min. Sp. |
| Oil Content—percent oil on non-volatile (calculated) | 58% | 62% | 58% | 63% | 56%. |
| Phthalic Anhydride (A.S.T.M. Des 563–45T) | 30% | 25% | 27½% | 25½% | 30.8%. |
| Type of Oil | Soya | Segregated Soya. | Soya | Soya | Soya. |
| Polyhydric Alcohol | Pentaerythritol Technical 100% | | | | |
| Acid No | 3–7 | 8 | 8–13 | 6–10 | 4–7. |
| Viscosity—Gardner-Holdt | W–Y | $Z_1$–$Z_3$ | U–X | Y–$Z_1$ | T–V. |

RESIN BINDER COMPONENTS OF THIS INVENTION

1. Ester resins

Typical of the oils, the fatty acids of which may form the esters used in this process are as follows: tung oil, oiticica oil, dehydrated castor oil, linseed oil, perilla oil, sunflower oil, poppyseed oil, soya bean oil, walnut oil, rapeseed oil, pineseed oil, olive oil, corn oil, cottonseed oil, coconut oil, babassu oil, hydroxylated oils such as castor oil, etc., and fish oils (train oils).

The following polyhydric alcohols are suitable for producing esters with the above fatty acids: glycerin, pentaerythritol, mannitol, sorbitol, alcohols formed by the condensation of bisphenol and epichlorhydrin, certain polyglycols, amongst others.

To form fatty acid modified alkyd resins, the following polycarboxylic acids and their anhydrides may be used: phthalic acid, maleic acid, succinic acid, malic acid, tartaric acid, fumaric acid, citric acid, adipic acid, sebacic acid, azelaic acid, suberic acid, etc., or anhydrides of such acids, also carbic anhydride. (Bicyclo 2-2-1 cycloheptane delta 5 dicarboxylic anhydride 2, 3.)

Very excellent results can be obtained by styrenated alkyds which are copolymers of fatty acid modified alkyd resins and polystyrene. Styrenated fatty oils, such as styrenated linseed and soyabean oil, or styrenated dehydrated castor oil yield also interesting products.

Very satisfactory results have been obtained with pentaerythritol esters of fatty acids. These may be advantageously precondensed with maleic anhydride. Particularly advantageous results were obtained with the con- Min. Sp. in the above table, under solvent, is mineral spirits. Some of the organic solvent-soluble melamine or urea resins are not miscible with mineral spirits; therefore, if such types of aminoaldehyde resins are used, the alkyd resins should be diluted with aromatic hydrocarbons, such as for instance, xylol. Such change in the solvent normally lowers the viscosity of the resin solution but otherwise does not change film characteristics.

Commercial examples of resins in the above list are: Beckosol P–471 (Reichhold Chemicals Corporation), Syntex 62 (Jones-Dabney Company), Aroplaz 1086M and Aroplaz 1241M (U.S. Industrial Chemicals, Inc.), and P6118 (Dock Resin Corporation).

Whereas, with this invention, resins with a minimum of 50% oil content are preferred, here below are listed chemical constants of two commercial pentaerythritol alkyd resins which are shorter in oil length, and may in some cases, yield satisfactory results:

|  | Resin F | Resin G |
| --- | --- | --- |
| Non-volatile content | 50% | 62%. |
| Solvent | Xylol | Xylol. |
| Oil content—percent oil on non-volatile (calculated) | 35% | 42%. |
| Phthalic anhydride (A.S.T.M. Des 563–45T) | 40.6% | 38%. |
| Type of oil | Linseed | Soya. |
| Polyhydric alcohol | Pentaerythritol Technical 100% | |
| Acid No | 15–25 | 4–6. |
| Viscosity—Gardner-Holdt | X–Z | $Z_1$–$Z_4$. |

The polyhydric alcohols, forming the esters useful as starting materials in this process should be preferably at least tri-hydric, such as glycerin.

In this process best results are obtained with polyhydric alcohol esters of acids of fatty oils, which esters contain in their acid component at least 50% acids of fatty acids having at least two double bonds. In this definition of fatty acid esters, there is included the group of drying and semi-drying fatty oils, further the group of synthetic oils and the group of alkyd resins, not containing more than 50% polybasic acids in their acid component.

Any appropriate mixtures or combinations of members of the above described classes may be used as desired.

The better drying a fatty oil is, the more suitable it is for the present process. Further: at least some of the fatty acids present in the esters should preferably contain more than one double bond in the molecule. This includes esters of the drying oil fatty acids and of the semi-drying fatty acids. The ester resins of this invention comprises in most cases polymers i.e. polyesters.

lowing is an example of polyvinyl chloride latices: Geon 151 Latex. The following is an example of a mixed latex of polyvinyl chloride and acrylonitrile-butadiene copolymer: Geon 552 Latex. The following is an example of a neoprene latex: Neoprene Latex 610. Elastomers which comprise copolymers of acrylonitrile and butadiene perform with advantage in this invention.

3. Organic solvent-soluble amino-aldehyde resins

The organic solvent-soluble amino-aldehyde resins are, for instance, alcohol modified condensation products of urea or melamine, or alkylated or etherified urea or melamine condensation products with an aldehyde, such as formaldehyde. Other amino-aldehyde resins which are known in the art which are solvent-soluble may also be incorporated. The term "organic solvent-soluble amino-aldehyde resins," as used in this application, refers to resins of that type which are water immiscible.

Commercial examples of organic solvent-soluble amino-aldehyde resins are as follows:

| Manufacturer | Trade name | Solids | Solvent |
|---|---|---|---|
| Rohm & Haas Co. (Resinous Products Division) | Uformite F158 | 50 | Xylol-Propanol (3:7). |
| | Uformite F200E | 50 | Xylol-Butanol (1:1). |
| | Uformite F210 | 50 | Do. |
| | Uformite F266E | 50 | Capryl-Alcohol-Butanol. |
| | Uformite F223 | 50 | Xylol-Butanol (1:1½). |
| | Uformite F240 | 60 | Do. |
| | Uformite F240N | 60 | High Flash Naptha. |
| | Uformite MM-46 | 60 | Xylol-Butanol (1:1). |
| | Uformite MM-55 | 50 | Xylol-Butanol (1:4). |
| | Uformite MM-55HV | 50 | Xylol-Butanol (1:9). |
| | Uformite MU-56 | 50 | Xylol-Butanol (1:3). |
| | Uformite MX-61 | 60 | Xylol-Butanol (1:1). |
| | Uformite M-311 | 50 | Xylol. |
| Reichhold Chemicals, Inc | Beckamine 3520 | 50 | Xylol-Butanol. |
| | Beckamine P-138 | 60 | Do. |
| | Beckamine P-196 | 60 | Butanol-Ethanol. |
| | Beckamine P-354 | 50 | Xylol-Butanol. |
| American Cyanamid Co | Beetle 212-9 | 60 | Butanol-Octyl alcohol-Petroleum Aromatic. |
| | Beetle 216-8 | 60 | Xylol-Butanol. |
| | Beetle 219-8 | 50 | Do. |
| | Beetle 220-8 | 50 | Do. |
| | Beetle 227-8 | 50 | Do. |
| | Beetle 230-8 | 50 | Do. |
| | Melmac 243-3 | 60 | Do. |
| | Melmac 245-8 | 50 | Do. |
| | Melmac 247-10 | 60 | Butanol. |
| | Melmac 248-8 | 55 | Xylol-Butanol. |
| Monsanto Chemicals Co | Resimene 875 | 50 | Butanol-Xylol. |
| | Resimene 876 | 50 | Do. |
| | Resimene 877 | 50 | Butanol-Mineral Spirits. |
| | Resimene 878 | 50 | Butanol-Butyl Cellosolve |
| | Resimene 881 | 60 | Butanol-Xylol. |
| | Resimene 882 | 65 | Xylol. |
| | Resimene 883 | 60 | Butyl Cellosolve-Mineral Spirits. |
| | Resimene U-901 | 50 | Butanol-Xylol. |
| | Resimene U-920 | 60 | Do. |
| (Plaskon-Barrett Div.) (Allied Chemical & Dye Corp.). | Plaskon 3382 | 55 | Xylol-Butanol. |

2. Elastomers

Examples of the elastomers useful in this invention are the following: Latices of acrylonitrile elastomeric polymers and copolymers, such as copolymers of butadiene and acrylonitrile and/or styrene, polyvinyl chloride, copolymers of polyvinyl chloride and polyvinyl acetate, polymers of isobutylene, polymers and copolymers of vinylidene chloride, polychloroprene, sometimes called neoprene and/or mixture of these, amongst others.

The elastomers mentioned may also be used in a form that first a solvent solution of the dry elastomer solids is made and the solution is emulsified to form oil-in-water emulsions. A neoprene cement or Hycar cement emulsified in water in a proper illustration. In view of the oil-in-water emulsion nature of the print pastes of this invention, in the illustrative examples elastomer latices will be given to illustrate the process.

The following are commercial products available which are latices of acrylonitrile-butadiene copolymers: Chemigum 200 Latex, Chemigum 235 AHS Latex, Chemigum 235 CHS Latex, Chemigum 245 AHS Latex, Chemigum 245 CHS Latex, Hycar 1561 Latex, Hycar 1551 Latex, Hycar 1562 Latex, Hycar 1552 Latex, Nitrex 2605 Latex, Nitrex 2614 Latex, Nitrex 2612 Latex. The fol- The Uformites which have MM in their number, the Melmacs, and the Resimene 800 Series are organic solvent-soluble melamine-aldehyde resins. The alcohols used to obtain this class of resins are exemplified by butyl alcohol, capryl alcohol, etc.

PIGMENT COMPONENT USED IN THIS INVENTION

The pigment components useful in this invention can be classified into organic pigments and inorganic pigments. Carbon black is herein considered as an organic pigment.

Organic pigments

The organic pigments used herein are usually prepared by precipitation methods. They are all water insoluble. As starting material for this invention either a filter press cake or dry powder can be used. Carbon black, if used, is not made by precipitation method and is used as dry powder in the process.

The following groups of pigments are illustrative, but do not limit the scope of the starting materials of this invention:

(1) PHTHALOCYANINE PIGMENTS

Phthalocyanine blue, which is a copper or tin-copper phthalocyanine is marketed under trade names of Monastral Fast Blue and as a Heliogen Blue. Phthalocyanine green, which is a chlorinated copper phthalocyanine color, is marketed under trade names of Monastral Fast Green, and as Heliogen Green.

(2) INSOLUBLE AZO PIGMENTS

Benzidine yellows are couplings between dichlorobenzidine and acetoacetic arylides, such as the acetoaceticanilide, -ortho toluidide, -xylidide, -para chloro anilide, O-anisidide and -ortho chloro anilide.

Benzidine orange is a coupling product of dichlorobenzidine with pyrazolone substitution products, such as methyl-phenyl-pyrazolone.

Hansa Yellows are acetoacetic arylide couplings with substituted anilines, like 4-chloro-2-nitroaniline, or ortho-nitraniline, amongst others.

Insoluble Azo Reds are coupling products of the Naphthol AS type compounds of beta-ortho-naphthoic acid, such as Naphthol AS, Naphthol AS-OL, Naphthol AS-BS, Naphthol AS-D with fast color salts, such as 2,5 dichloroaniline, p - nitro - orthotoluidine, p - nitro - orthoanisidine, amongst others. One example being the coupling product of Naphthol AS-ITR with ITR Fast color salt. (Fast Red Color Salt ITR.)

Naphthol AS type couplings may yield also yellows and oranges of the insoluble azo pigment group. Aniline Black pigment can be listed here too.

Toluidine maroon and Dianisidine Blue and a brown pigment obtained by forming the copper salt of paranitraniline red are other examples.

(3) VAT PIGMENTS

Vat pigments are of the indigoid or anthraquinone type. The indigoid type includes thioindigo derivatives and the anthraquinone type includes derivatives of flavanthrene, benzanthrone and complex structures made by condensing benzanthrone molecules.

Thioindigo Red B has Color Index No. 1207 and Schultz No. 912. For structural formulae see pages 204 to 214 in Pratt: Chemistry and Physics of Organic Pigments, John Wiley & Sons, 1947.

Indanthrene Blue Color Index No. 1106, Schultz No. 837 is an example of the anthraquinone type vat pigments.

Structural formulae of some vat pigments are listed on pages 429 to 435 in volume V of Mattiello: Protective and Decorative Coatings, John Wiley & Sons, Inc., New York, 1946. They include Indanthrene Rubine RD, Indanthrene Orange RRTA, Indanthrene Golden Orange GA, Indanthrene Brown RA, Helio Fast Yellow 6GL, Indanthrene Brilliant Violet 3BA, Fast Violet 4RN, Indigo Blue, Indanthrene Navy Blue RA.

(4) CARBON BLACKS

Furnace Blacks, Channel Blacks, acetylene gas blacks and lampblacks can also be used in the instant process.

Inorganic pigments

Examples of inorganic pigments useful as starting materials of this invention are amongst others:

Titanium dioxide
Precipitated iron oxide pigments (for instance, yellow and brown iron oxides)
Cadmium sulfide and selenide pigments such as Cadmium yellows, oranges, and reds

PREFERRED METHOD OF MAKING WATER DISPERSIONS OF ORGANIC PIGMENTS

In the pigment dispersion step of this invention the following dispersing agents are preferred:

Fatty alcohol sulfates, such as sodium, ammonium, morpholine or triethanolamine salts of sulfates of lauryl alcohol, cetyl alcohol, oleyl alcohol and/or their mixtures. Sulfates of hydroabietyl alcohol act similarly to fatty alcohol sulfates.

Examples of commercial products are Duponol ME, which is a dry powder form of sodium lauryl sulfate, manufactured by E. I. du Pont de Nemours & Co., and Duponol WA paste, which is a water paste of the same compound, containing 30% active ingredient and some inorganic salt impurities.

It was found that the action of fatty alcohol sulfates is greatly enhanced and improved by using as further additive a minor quantity of sodium alkyl naphthalene sulfonates, such as the isopropyl naphthalene sulfonate and the isobutyl naphthalene sulfonate. The former is marketed under the trade name of Nekal A by the General Dyestuff Corporation and the latter as Nekal DK by the same company.

Further improvement in degree of deflocculation of the pigment is obtained, by adding protective colloids to the water dispersion, such as casein and methylcellulose.

The proportion of surface active agent to pigment content is very important. The fatty alcohol sulfates may be added, for instance, in proportions of 2 to 20% per 100 parts of dry pigment, but for complete deflocculation of the pigment at least 10% and preferably 15 to 20% are used. Higher proportions of fatty alcohol sulfates are permissible, but do not seem to produce further improvement, in deflocculation, to a degree to warrant such increase. Larger proportions may be used, however, to satisfy specialty purposes of incorporation into finished products or to satisfy machinery limitations.

The sodium alkyl sulfonates are added in proportions of ½% to 4% based on the pigment content, 2% being a preferred and satisfactory proportion.

If protective colloids are added, about 1% of dry casein is used, based on the dry pigment content and about 5% methylcellulose low viscosity type, designated as 15 cps. type in the trade. Larger quantities of protective colloids can be added, but their action is distinct in the here given proportions. They help to complete defloc-culation and keep the particles in suspension.

Some pigments require larger proportions than 20% surface active agent, and the required percentage may go up as high as 40%.

A further improvement of the pigment dispersion step of this invention consists in carrying out the deflocculation of the pigment at elevated temperature which ranges from above room temperature to below the boiling point of water, as for instance 90° C.

Carbon blacks are advantageously converted to water dispersions by this method for the purposes of this invention.

EMULSIFYING AGENTS USEFUL TO PREPARE RESIN BINDER EMULSIONS

Great variety of emulsifying agents may be used in my process. A list of such emulsifying agents is given, for instance, under the title of Surface-Active Agents in the January 1943 issue of Industrial and Engineering Chemistry, on pages 126 to 130.

Soaps of fatty acids are for instance satisfactory emulsifying agents. A list of some others is given herewith:

| Trade Name and Source of Supply | Manufacturer's Description |
| --- | --- |
| Duponol ME, E. I. DuPont de Nemours & Co. | Fatty alcohol sulphate, sodium salt. |
| Aerosol OT, American Cyanamid Co. | Dioctyl ester of sodium sulphosuccinic acid. |
| Emulphor AG, General Dyestuff Corp. | Polyethyleneoxide condensation product. |
| Beta Sol, Onyx Oil & Chemical Co. | Quaternary ammonium salt. |
| Igepon, General Dyestuff Corp. | Sodium Sulphonate of an oleic acid ester of an aliphatic compound, for instance, of the type of $C_{17}H_{33}COH$ —$(OH_3)$—$C_2N_4SO_3Na$. |
| Triton 720 and 770, Rohm & Haas Co. | Sodium salt or aryl alkyl poly ether sulphonate. |
| Emulgor A, Glyco Products | A highly polymerized glycol ester. |

From the various emulsifying agents such types are most suitable, which are active both on the acid side and on the alkaline side. The non-ionic emulsifying agents belong to that class, such as for instance, nonaethyleneglycolmonooleate, or the corresponding dioleate, or the corresponding monolaurate or dilaurate or monoricinoleate or diricinoleate (Glyco Products). A further satisfactory group is the one of the cation-active emulsifying agents. Examples are the quaternary ammonium salts. As will be seen, the fatty alcohol sulphates (for instance, Duponol ME) are also suitable for this process.

*Cationic emulsifying agents*

Satisfactory oil-in-water emulsions can be prepared with cationic agents. Most of them, however, work on the acid side only. Many times alkaline pH is of advantage for certain purposes.

The main difficulty is to find proper cationic pigment dispersion agents in water, as most of them act as flushing agents, which will drive the pigment from the water to the oil phase. Pigment flocculation occurs with such agents, should they be used with oil-in-water emulsions, particularly if they are emulsion polymerized, as the pigment is not in direct contact with the oil phase. Either the emulsion breaks or the pigment flocculates, or both.

Very satisfactory results can be obtained with lauryl pyridinium chloride, cetyl-dimethyl-benzyl ammonium chloride (Triton K–60, Rohm & Haas), methyl dodecyl benzyl trimethyl ammonium chloride (Hyamine 2389, Rohm & Haas Co.), stearylamine acetate and laurylamine acetate, amongst others.

They may be used as emulsifying agents to form oil-in-water resin emulsions and the first and third mentioned ones act as good pigment dispersing agents also.

PROTECTIVE COLLOIDS USEFUL IN THE PRODUCTS

In the example of this specification casein, methylcellulose and sodium carboxymethylcellulose are mentioned as suitable protective colloids. Others which may be used are: gum tragacanth, carrageen moss, dextrin, starch solutions, sodium poly-acrylates, sodium poly-methacrylates, hydroxy ethylcellulose of the water soluble and alkali soluble types, locust bean gum, water soluble salts of the maleic adduct of styrene, etc. Alginates may be used also, or albumene or soya protein. Other examples are water soluble ethyl-hydroxy-ethylcellulose, carboxymethylstarch, hydroxy-propyl-starch ether, polyvinyl pyrolidone, polyvinyl alcohol, amongst others.

As far as protective colloids and emulsifying agents go, care should be exercised that anionic and non-ionic agents and systems may be mixed, and cationic agents and systems may be mixed with non-ionic agents and systems, but cationic and anionic agents or systems normally cause flocculation of the emulsion or of the pigments. Ammonium caseinate, e.g., acts anionic, but it is possible to use casein in cationic systems, if it is dissolved with the aid of cationic quaternary ammonium compounds.

PIGMENT COLOR CONCENTRATE COMPONENT

The pigment color concentrate component of this invention contains an aqueous pigment dispersion. These pigment color concentrates dilute with water and may contain resin binder or may be resin-free. The pigment content of these pigment color concentrates varies.

Illustrative limits are, for example:

|  | Organic Pigments | Inorganic Pigments |
| --- | --- | --- |
| If binder resin present | from about 4.5% to about 30.0% (by weight). | from about 12.0% to about 35.0% (by weight). |
| If binder resin is absent | from about 10.0% to about 40.0% (by weight). | from about 30.0% to about 70.0% (by weight). |

ADDED CATALYSTS

It is known in the art to catalyze the thermo-setting process of water soluble amino-aldehyde resins by acids, for instance, or by salts of acids which at the curing temperature (thermo-setting temperature) will split off free acid. These acids and salts are water soluble and many of them are insoluble in organic solvent systems. From the organic solvent-soluble amino-aldehyde resins the urea formaldehyde resins were catalyzed in the art by the action of organic solvent-soluble catalysts such as various alkyl-phosphoric acids. The phenomenon of "catalytic action" as the expression is used in this application is evidenced by either a reduction of time of thermo-setting at a given temperature, or reduction of the thermo-setting temperature for a given time, required to produce the satisfactory wet-abrasion-resistant decorated surface.

The surprising discovery was made according to this invention, that the following water soluble catalysts can effect catalytically the thermo-setting process of organic solvent-soluble melamine-aldehyde resins, when the latter are present in a stable oil-in-water emulsion. Similarly organic solvent-soluble urea-aldehyde resins can also be catalyzed in the same way.

Examples of such catalysts are: tartaric acid, glycolic acid (hydroxy acetic acid), lactic acid, benzoic acid, sulfuric acid, nitric acid, formic acid, amongst others. These acids are advantageously incorporated in form of their ammonium salts, like ammonium tartarate, ammonium glycolate, ammonium lactate, ammonium sulphate, ammonium nitrate, ammonium phosphate, and ammonium benzoate. These ammonium salts, when added to an emulsion, which has a pH higher than 7, the pH of the emulsion being adjusted by ammonia, are stable in the emulsion and after the print paste is applied and the print heated to elevated temperatures will split off free acid in situ, thereby catalyzing the thermo-setting reaction. Instead of ammonium salts, other salts may be used which act similarly, morpholine salts being an example.

BUILT-IN CATALYSTS

According to another improvement of this process, surface active agents may be used in the pigmented resin emulsions, which may be a pigment dispersing agent or an emulsifying agent, which is a salt of a non-fixed base, such as ammonia or morpholine, amongst others. Such surface active agent while the emulsion is stored with a pH above 7 will remain inactive and stable, and after the textile decoration has been achieved and the fabric is heated to elevated temperature, it will split off free acid, which acts as a catalyst for the thermo-setting reaction of the organic solvent-soluble amino-aldehyde resins.

Examples are: ammonium fatty alcohol sulfates, such as, ammonium oleyl sulfate, ammonium cetyl sulfate, ammonium lauryl sulfate, morpholine oleyl sulfate, dioctyl ester of ammonium sulphosuccinic acid, ammonium sulphonate of an oleyl acid ester of an aliphatic compound, ammonium salts of aryl-alkyl polyether sulphonates, ammonium isopropyl naphthalene sulphonate, etc.

ADDITION OF WATER-SOLUBLE AMINO-ALDEHYDE RESINS

According to this invention, the surprising discovery was made that small quantities of water-soluble amino-aldehyde resins sensitize the organic solvent-soluble amino-aldehyde resins undergoing the thermo-setting process.

Examples are: Water-soluble polymers of trimethylol melamine and hexamethylol melamine, or their substitution products such as methyl or ethyl ethers thereof, amongst others. Water-soluble urea-aldehyde resins and substituted urea-aldehyde resins are also suitable. The quantity of such sensitizers is small and it is usually in the range of 5% to 20% based on the color concentrate portion of the print paste or from about 0.2 weight part up to 1 weight part for every one weight part of dry pigment in the textile decorating composition. In the preferred range 0.6 weight part for every one weight part of pigment approaches the maximum satisfactory proportion. The actual chemical nature of this reaction has not yet been fully investigated. Resloom M-75, Aerotex M-3 resin and Lyofix CH are commercially available examples of products useful in this phase of the invention.

ILLUSTRATIVE EXAMPLES

In the description which follows there are given by way of illustration of the invention, examples showing the preparation of the new compositions and the results obtained when textile fabrics are colored therewith compared with corresponding results obtained with known compositions. It is convenient to give as a preliminary, accounts of the procedures used in the preparation of compositions to which reference is made in the examples themselves.

*Example 1 (a prior art binder emulsion) Procedure A*

The binder emulsion of this example contains 40.8% total non-volatile content, 2.91% non-volatile ester resin described in Example 2 of U.S. Patent No. 2,637,621, issued May 5, 1953, 0.32% of non-volatile melamine-formaldehyde resin, organic solvent-soluble, 36.39% non-volatile elastomer which is a combination of a copolymer of acrylonitrile and butadiene and of a copolymer of polyvinyl chloride and polyvinyl acetate, 0.89% of protective colloid and 0.29% of surface active agent, the volatile portion being mostly water, with some organic solvent present.

The product of this example represents a binder emulsion which is now on the market and is useful to produce comparisons which illustrate the improvement of this process.

*Example 2 (a prior art extender clear emulsion) Procedure B*

This example describes a typical clear extender emulsion commercially available.

I

| | Parts by weight, lbs. |
|---|---|
| Water | 20.30 |
| Ammonia | .25 |

II

| | |
|---|---|
| Methylcellulose powder (4000 cps.) dry (to .50 lbs.) | .30 |
| Solvent | 1.20 |

III

| | |
|---|---|
| Water | 26.05 |
| Petroleum solvent | 49.75 |

IV

| | |
|---|---|
| Emulsifier | 1.65 |
| Extender concentrate | .50 |
| | 100.00 |

DIRECTIONS

I. Measure water and ammonia into a mixing tank of suitable size. Start the mixer.

II. Mix in a pail, with spatula or stick, methylcellulose powder and solvent until dry methylcellulose is completely wetted out. Then pour mixture into "I" while running mixer. Mix for 2 to 3 minutes until methylcellulose is thoroughly dispersed in water and a solution free of lumps is obtained.

III. Add water and then petroleum solvent to "I" while mixing.

IV. Add the emulsifier and the extender concentrate to "I" while mixing. Then mix for an additional 5 to 10 minutes to obtain a homogeneous and uniform emulsion.

NOTE

If an extender of a higher viscosity is desired than is obtained by the use of .30% of methylcellulose, the methylcellulose content may be increased up to .50% or even higher. This means that when making up a formula by weight, use .50 lbs. of methylcellulose per 100 lbs. and cut out the corresponding amount of water from the formula.

The extender concentrate used in this example contains 25% non-volatile melamine-formaldehyde resin, butylated, organic solvent-soluble, 25% organic solvent which is a mixture of xylol and butyl alcohol, an emulsifying agent in the proportion of 1% to 5% (expressed as "active" emulsifying agent), and some protective colloid, the balance being water.

The emulsifier used in the clear extender emulsion of this example has 30% active ingredient, which is an alkyl sulfate.

*Example 3 (a pigment dispersion in water) Procedure C*

This example describes the preparation of pigment dispersion in water which illustrates a useful intermediate product in this process.

To a phthalocyanine green press cake marketed under the trade name of Heliogen Green GV presscake, having 27.6% pigment content, Duponol ME dry powder was added to yield 18% Duponol on the pigment content, and Nekal A dry powder was added to yield 2% addition on the pigment content. The press cake was mixed with a spatula by hand and after 5 minutes it became completely liquid. It has been found that dry powder addition, which is attractive as it does not increase water content, yields very satisfactory results. However, the premixing represents some problem and knife pronged agitators are needed, such as pony mixer blades, to liquefy the press cake to a slurry. Propeller types, or other turbine type agitators do not work well at this stage, as they could not manage to break up the lumps of the press cake. The premix is then further dispersed by the aid of an Eppenbach Homomixer, which is a high speed enclosed turbine mixer, having a narrow clearance between turbine and stator. It runs about 3,600 r.p.m. About 15 minutes is satisfactory, but occasionally up to 30 minutes may be used. A 5 H.P. motored mixer satisfactorily disperses a 500 lb. press cake quantity in a 55 to 60 gal. size drum. (Open head drum.) The active ingredient in Duponol ME dry powder is the same as that of Duponol WA paste, i.e. technical sodium lauryl sulfate.

The homomixed slurry is passed through a colloid mill, to complete dispersion and deflocculation. Pebble milling is also very satisfactory to complete pigment deflocculation and dispersion. 24 hours to 48 hours are satisfactory milling times.

*Example 4 (oil-in-water color concentrate using organic pigment) Procedure D*

For the illustration of this process a pigmented oil-in-water color concentrate is prepared having the following composition:

| | |
|---|---|
| Ester resin (for instance dehydrated castor oil ester of a condensation product of bisphenol and epichlorhydrine, applied from 50% solution in xylol)  percent N.V | 3.36 |
| Melamine-formaldehyde resin, organic solvent-soluble, like Melmac 245-8, applied from 50% solution in xylol-butanol mixture  percent N.V | 0.37 |
| Protective Colloids  do | 1.61 |
| Surface active agents, such as fatty alcohol sulfates, alkyl-aryl-sulfonates  percent N.V | 1.96 |
| Total pigment-free N.V  do | 7.30 |
| Pigment  do | 10.40 |
| Total non-volatile  do | 17.70 |
| Water immiscible organic solvent (from resin solutions)  percent | 3.73 |
| Water  do | 78.57 |
| Total  do | 100.00 |

The pigment of this example is a vat violet, Color Index No. 1104. This product is prepared by first making a pigment dispersion in water by the method outlined in Example 3 (Procedure C) and mixing therewith a prepared resin emulsion of the oil-in-water type. The surface active agents include the pigment dispersing agents used in preparing the water dispersion of the pigment, and the emulsifying agents used in preparing the resin emulsion. The protective colloids are partly used in the pigment dispersion component and derived in part from the pigment dispersion component and in part from the resin emulsion component. The product of this example is a pigmented oil-in-water color concentrate. In this example the resins and pigments can be varied, using other equivalent products described in this specification.

*Example 5 (oil-in-water color concentrate using inorganic pigment) Procedure E*

This example is similarly prepared as the product of Example 4. It contains the following ingredients:

| | |
|---|---|
| Ester resin _____ percent N.V.. | 10.63 |
| Organic solvent-soluble melamine formaldehyde resin _____ percent N.V.. | 1.17 |
| Protective colloid _____ do____ | 3.99 |
| Surface active agent _____ do____ | 6.45 |
| Total pigment-free N.V. _____ do____ | 22.24 |
| Pigment _____ do____ | 28.85 |
| Total non-volatile _____ percent__ | 51.09 |
| Water immiscible organic solvent _____ do____ | 11.80 |
| Water _____ do____ | 37.11 |
| Total _____ do____ | 100.00 |

The pigment of this example is a cadmium yellow inorganic pigment toner. Because of the lower water absorption properties of this pigment, a color concentrate with a substantially higher pigment content can be prepared than in the case of the vat violet pigment of Example 4.

Example 4 represents a pigmented oil-in-water resin emulsion color concentrate with a comparatively lower pigmentation and Example 5 represents a similar product with a high pigmentation. With regard to pigmentation, for illustration purposes, the products of Examples 4 and 5 may be considered to illustrate the low and high extremes.

*Example 6 (conventional print pastes) Procedure F*

The following illustrates a conventional method for print paste formulations:

A. Preparation of a 1:4 weight cut print paste:
   100 weight parts of color concentrate, for instance that of Example 4 or of Example 5.
   50 weight parts of resin binder emulsion of Example 1.
   350 weight parts of clear extender emulsion of Example 2.

Total: 500 weight parts.

This cut contains 20% color concentrate by weight.

B. Preparation of a 1:49 weight cut print paste:
   50 weight parts of 1:4 weight cut print paste as described in this example, 6A above.
   450 weight parts of clear extender emulsion of Example 2.

Total: 500 weight parts.

This cut contains 2% color concentrate by weight.

C. Preparation of a 1:99 weight cut print paste:
   5 weight parts of 1:4 weight cut print paste as described in this example, 6A above.
   95 weight parts of clear extender emulsion of Example 2.

Total: 100 weight parts.

This cut contains 1% color concentrate by weight.

D. Preparation of a 1:99 weight cut print paste:
   2.5 weight parts of 1:4 weight cut print paste as described in Example 6A above.
   97.5 weight parts of clear extender emulsion of Example 2.

Total: 100.0 weight parts.

This cut contains 0.5% color concentrate by weight.

When using the color concentrates of Examples 4 and 5 respectively the print pastes herein listed show the following analysis:

TABLE 1 (CONVENTIONAL PRINT PASTES)

*Present in 100 weight parts of print paste*

NON-VOLATILE COMPONENTS OF BINDER

| Weight Cut | Color Concentrate | Pigment, Non-Volatile | Ester Resins, Non-Volatile | Organic solvent-soluble amino-aldehyde resins, Non-Volatile | Elastomer, Non-Volatile | Total Binder, Non-Volatile | Total N.V. |
|---|---|---|---|---|---|---|---|
| 1:4 (6A) | Color Concentrate of Example 4 (Violet). | 2.08 | 0.96 | 0.20 | 3.64 | 4.80 | 6.88 |
| | Color Concentrate of Example 5 (Yellow). | 5.77 | 2.41 | 0.36 | 3.64 | 6.41 | 12.18 |
| 1:49 (6B) | Color Concentrate of Example 4 (Violet). | 0.208 | 0.096 | 0.137 | 0.364 | 0.597 | 0.805 |
| | Color Concentrate of Example 5 (Yellow). | 0.577 | 0.241 | 0.153 | 0.364 | 0.758 | 1.335 |
| 1:99 (6C) | Color Concentrate of Example 4 (Violet). | 0.104 | 0.048 | 0.133 | 0.182 | 0.363 | 0.467 |
| | Color Concentrate of Example 5 (Yellow). | 0.289 | 0.121 | 0.141 | 0.182 | 0.444 | 0.733 |
| 1:199 (6D) | Color Concentrate of Example 4 (Violet). | 0.052 | 0.024 | 0.132 | 0.091 | 0.247 | 0.299 |
| | Color Concentrate of Example 5 (Yellow). | 0.144 | 0.060 | 0.136 | 0.091 | 0.287 | 0.431 |

TABLE 2 (CONVENTIONAL PRINT PASTES)

Table 2 illustrates the proportion of the three main binder ingredients by weight, based on 1 weight part of dry pigment present in a 1:4 weight cut print paste of this example (Procedure F).

|  | Using Color Concentrate of Example 4 (Violet) | Using Color Concentrate of Example 5 (Yellow) |
|---|---|---|
|  | Weight parts | Weight parts |
| Dry Pigment | 1. | 1 |
| Ester Resin | 0.46 | 0.42 |
| Organic solvent-soluble amino-aldehyde resin | 0.10 | 0.06 |
| Elastomer | 1.75 | 0.63 |
| Total binder per 1 part pigment | 2.31 | 1.11 |

TABLE 3 (PROCEDURE F—CONVENTIONAL PRINT PASTES)

Considering the three binder components of Table 2 as 100 weight parts the percent proportions of the three binder components in the 1:4 weight cut print pastes is as follows:

|  | Using Color Concentrate of Example 4 (Violet) | Using Color Concentrate of Example 5 (Yellow) |
|---|---|---|
|  | Percent by weight | Percent by weight |
| Ester Resin | 19.9 | 37.8 |
| Organic solvent-soluble amino-aldehyde resin | 4.3 | 5.4 |
| Elastomer | 75.8 | 56.8 |
|  | 100.0 | 100.0 |

EXAMPLES ILLUSTRATING THE PRESENT INVENTION

*Example 7 (Preparation of binder emulsion prior to incorporation of elastomer)*

I. In the first phase of the preparation, weigh into a tank:

| | Weight parts |
|---|---|
| Water | 187.73 |
| Lecithin | 7.70 |
| Sodium lauryl sulfate paste, technical grade, 30% active (e.g. Duponol WAQ) | 265.40 |
| Antifoam agent (e.g. Span 85 which is a sorbitol derivative) | 7.10 |
| Aqueous concentrated ammonia, 26° Bé. | 15.97 |
| 18% casein solution in water, (see below) | 84.80 |
| Morpholine | 15.70 |

II. In the second step, pre-mix:

| | |
|---|---|
| Methylcellulose 15 cps. | 11.60 |
| Mineral spirits | 11.60 |

To wet out the surface of the methylcellulose, then add slowly in increments, the pre-mix under agitation with a high speed enclosed turbine agitator to the aqueous mixture of "I" above.

III. Third: Pre-mix the following ingredients as resin mixture:

| | |
|---|---|
| Ester resin like for instance a dehydrated castor oil ester of the condensation product of epichlorhydrine and bisphenol, (e.g. Epitex 120), 50% non-volatile in xylol | 172.70 |
| Drier mixture (see below) | 2.80 |
| Butyl alcohol modified melamine-formaldehyde resin, 50% non-volatile in mixture of xylol and butanol, like for instance Resimene 875 | 216.90 |
| | 1000.00 |

Add the resin mixture of "III" in increments and slowly under high speed enclosed turbine type mixer to the mixture of "I" and "II" above.

DRIER MIXTURE

Lead naphthenate solution, 24%; metal content, 200 parts by weight.
Cobalt naphthenate solution, 6%; metal content, 25 parts by weight.
Zinc naphthenate solution, 6%; metal content, 30 parts by weight.

CASEIN SOLUTION

Casein dry, 7.75 parts by weight (Protovac 8397), 90% active.
Water, 31 parts by weight.
Dowicide A, 0.0775 parts by weight (1% on casein).
Dowicide G, 0.0775 parts by weight (1% on casein) Na salt of pentachlorophenol).
Ammonia, Conc., 0.1163 parts by weight (1½% on casein) (Na salt of orthophenylphenol).

*Example 8 (Concentrated binder emulsion)*

Weigh in a tank 637.6 weight parts of the product of Example 7 and add to it a latex mixture of 362.4 weight parts, to total 1000 weight parts. The non-volatile content of the latex mixture used in this example is 43%. As an illustration, 100 parts by weight of non-volatile latex components may comprise 76.7 weight parts of a copolymer of acrylonitrile and butadiene and 23.3 weight parts of polyvinyl chloride. Other elastomer latices of this invention may be used in this example, making replacement on the basis of actual latex non-volatile content.

*Example 9 (Preparation of binder emulsion with built-in catalyst prior to incorporation of elastomer)*

This example is prepared in the same manner as Example 7, except replacing ammonium lauryl sulfate, technical grade, 30% active, for the sodium lauryl sulfate used in Example 7.

*Example 10 (Concentrated binder emulsion with built-in catalyst)*

This example is prepared in the same manner as Example 8, except using the product of Example 9 instead of the product of Example 7.

The composite binder emulsions of Examples 8 and 10 contain approximately 35 to 37% non-volatile components. Further: they contain approximately 5.51 weight percent non-volatile ester resin, 6.92 weight percent non-volatile amino-aldehyde resin, and 16.60 weight percent non-volatile elastomer. Considering the total sum of these three percentages to be equal to 100, the binder proportions are: about 19.7 weight percent of ester resin, about 24.7 weight percent of amino-aldehyde resin, and about 55.6 weight percent of elastomer.

*Example 11 (Concentrated binder emulsion)*

A product similar to that of Example 8 is prepared, but adjusting the non-volatile ester resin content to 5.68 weight percent, the non-volatile organic solvent-soluble amino-aldehyde resin to be 7.12% and the non-volatile elastomer to 16.38 weight percent. In this example if the non-volatile total of the three binder ingredients is 100 weight parts, the ester resin content is 19.5 weight percent, the amino-aldehyde resin is 24.4 weight percent and the elastomer is 56.1 weight percent.

Example 12 (Clear extender emulsion)

A clear extender emulsion is prepared as follows:
Place in a mixing tank:
- 28.65 weight parts of the emulsion of Example 11,
- 9.52 weight parts of 3% methylcellulose 4000 cps. grade solution in water,
- 1.57 weight parts of ammonium lauryl sulfate, technical grade, 30% active,
- 0.20 weight parts of an antifoam agent, for example, Span 85, a sorbitol derivative,
- 12.02 weight parts of water.
  Mix these ingredients and incorporate in increments, using an enclosed turbine high speed agitator:
- 48.04 weight parts of mineral spirits.

Total 100.00 weight parts.

This clear extender emulsion contains 1.63 weight percent ester resin non-volatile component, 2.05 weight percent organic solvent-soluble amino-aldehyde resin non-volatile component, and 4.69 weight percent elastomer non-volatile component.

In 100 parts of binder non-volatile components this product contains 19.5 weight percent ester resin, 24.4 weight percent amino-aldehyde resin, and 56.1 weight percent elastomer.

Example 13 (Clear extender emulsion)

A clear extender emulsion is prepared as follows:
Place in a mixing tank:
- 12.97 weight parts of the emulsion of Example 11,
- 10.00 weight parts of 3% methylcellulose 4000 cps. grade solution in water,
- 1.65 weight parts of ammonium lauryl sulfate, technical grade, 30% active,
- 0.21 weight parts of an antifoam agent, for example, Span 85, a sorbitol derivative,
- 24.71 weight parts of water.
  Mix these ingredients and incorporate in increments, using an enclosed turbine high speed agitator:
- 50.46 weight parts of mineral spirits.

Total 100.00 weight parts.

This clear extender emulsion contains 0.74 weight percent ester resin non-volatile component, 0.92 weight percent organic solvent-soluble amino-aldehyde resin non-volatile component, and 2.12 weight percent elastomer non-volatile component.

The proportions of percentages in the binder component of this clear extender emulsion are similar to that of Example 12.

Example 14 (Print paste)

This example illustrates the preparation of print paste formulation according to this invention:

A. Preparation of a 1:4 weight cut print paste:
- 100 weight parts of color concentrate, for instance, that of Example 4 or of Example 5,
- 100 weight parts of the emulsion of Example 11,
- 10 weight parts of a water soluble melamine-formaldehyde resin, 60% non-volatile content (e.g. Resloom M-75),
- 290 weight parts of clear extender emulsion of Example 12 or of Example 13.

Total: 500 weight parts

This cut contains 20% color concentrate by weight.

B. Preparation of a 1:49 weight cut print paste:
- 50 weight parts of 1:4 weight cut print paste as described in this example, further above. (14-A.)
- 450 weight parts of clear extender emulsion of Example 12 or Example 13.

Total: 500 weight parts.

This cut contains 2% color concentrate by weight.

C. Preparation of a 1:99 weight cut print paste:
- 5 weight parts of 1:4 weight cut print paste as described in this example, further above. (14-A.)
- 95 weight parts of clear extender emulsion of Example 12 or Example 13.

Total: 100 weight parts.

This cut contains 1% color concentrate by weight.

TABLE 4 OF PRESENT INVENTION (EXAMPLE 14)

*Present in 100 weight parts of print paste*

| Weight Cut | Color Concentrate | Pigment, Non-Volatile | Ester Resins, Non-Volatile | Organic solvent-soluble amino-aldehyde resins, Non-Volatile | Elastomer, Non-Volatile | Water Soluble amino-aldehyde resin N.V. | Total Binder, N.V. | Total N.V. |
|---|---|---|---|---|---|---|---|---|
| 1:4 (14A) | Color Concentrate of Example 4 (Violet) using clear extender emulsion of Example 12 | 2.08 | 2.75 | 2.68 | 6.00 | 1.20 | 11.43 | 14.71 |
| | Color Concentrate of Example 4 (Violet) using clear extender emulsion of Example 13 | 2.08 | 2.24 | 2.03 | 4.51 | 1.20 | 8.78 | 12.06 |
| | Color Concentrate of Example 5 (Yellow) using clear extender emulsion of Example 12 | 5.77 | 4.21 | 2.84 | 6.00 | 1.20 | 13.05 | 20.02 |
| 1:49 (14B) | Color Concentrate of Example 4 (Violet) using clear extender emulsion of Example 12 | 0.208 | 1.744 | 2.104 | 4.82 | 0.12 | 8.668 | 8.996 |
| | Color Concentrate of Example 4 (Violet) using clear extender emulsion of Example 13 | 0.208 | 0.89 | 1.03 | 2.36 | 0.12 | 4.28 | 4.608 |
| | Color Concentrate of Example 5 (Yellow) using clear extender emulsion of Example 12 | 0.577 | 1.89 | 2.12 | 4.82 | 0.12 | 8.83 | 9.527 |
| 1:99 (14C) | Color Concentrate of Example 4 (Violet) using clear extender emulsion of Example 12 | 0.104 | 1.687 | 2.072 | 4.755 | 0.06 | 8.514 | 8.678 |
| | Color Concentrate of Example 4 (Violet) using clear extender emulsion of Example 13 | 0.104 | 0.815 | 0.976 | 2.24 | 0.06 | 4.031 | 4.195 |
| | Color Concentrate of Example 5 (Yellow) using clear extender emulsion of Example 12 | 0.289 | 1.760 | 2.08 | 4.755 | 0.06 | 8.595 | 8.944 |
| 1:199 (14D) | Color Concentrate of Example 4 (Violet) using clear extender emulsion of Example 12 | 0.052 | 1.659 | 2.056 | 4.723 | 0.03 | 8.438 | 8.520 |
| | Color Concentrate of Example 4 (Violet) using clear extender emulsion of Example 13 | 0.052 | 0.777 | 0.948 | 2.18 | 0.03 | 3.905 | 3.987 |
| | Color Concentrate of Example 5 (Yellow) using clear extender emulsion of Example 12 | 0.144 | 1.695 | 2.06 | 4.723 | 0.03 | 8.478 | 8.652 |

Notes to Table 4:
The column headed "Total Binder N.V." is the sum of the ester resin N.V., plus the organic solvent-soluble amino-aldehyde resin N.V., and plus the elastomer N.V. It does not contain the water-soluble amino-aldehyde resin N.V.
The "total N.V." column of this table includes the pigment and the water-soluble amino-aldehyde resin N.V. also.

D. Preparation of a 1:199 weight cut print paste:
    2.5 weight parts of 1:4 weight cut print paste as described in this example, further above. (14-A.)
    97.5 weight parts of clear extender emulsion of Example 12 or Example 13.

Total: 100.0 weight parts.

This cut contains 0.5% color concentrate by weight.

When using the clear extender emulsions of Examples 12 and 13 respectively the print pastes herein listed show the following analysis (see Table 4):

TABLE 5
*(Example 14)*

Table 5 illustrates the proportion of the three main binder ingredients by weight, based on 1 weight part of dry pigment present in a 1:4 weight cut print paste of this Example 14.

| | Using Color Concentrate of Example 4 (Violet) with clear Extender Emulsion of Example 12 | Using Color Concentrate of Example 4 (Violet) with clear Extender Emulsion of Example 13 | Using Color Concentrate of Example 5 (Yellow) with clear Extender Emulsion of Example 12 |
|---|---|---|---|
| | Wt. pts. | Wt. pts. | Wt. pts. |
| Dry Pigment | 1 | 1 | 1 |
| Ester Resin | 1.32 | 1.08 | 0.73 |
| Organic solvent-soluble amino-aldehyde resin | 1.29 | 0.98 | 0.49 |
| Elastomer | 2.88 | 2.17 | 1.04 |
| Water-soluble melamineformaldehyde resin | 0.58 | 0.58 | 0.21 |
| Total binder per 1 part Pigment | 6.07 | 4.81 | 2.47 |

TABLE 6
*(Example 14)*

Considering the three binder components of Table 2 as 100 weight parts, the percent proportions of the three binder components of this invention are as follows:

| | Using Color Concentrate of Example 4 (Violet) with clear extender emulsion of Example 12 | Using Color Concentrate of Example 4 (Violet) with clear extender emulsion of Example 13 | Using Color Concentrate of Example 5 (Yellow) with clear extender emulsion of Example 12 |
|---|---|---|---|
| | Percent by wt. | Percent by wt. | Percent by wt. |
| Ester Resin | 24.00 | 25.5 | 32.35 |
| Organic solvent-soluble amino-aldehyde resin | 23.50 | 23.2 | 21.65 |
| Elastomer | 52.50 | 51.3 | 46.00 |
| | 100.00 | 100.0 | 100.00 |

*Example 15 (Print paste with added catalyst)*

Print pastes are prepared according to this example similarly to those used in Example 14, except that the product of Example 8 is used in the printing both as an additive to the print paste in preparing the 1:4 cuts and as a base for preparing the clear extender emulsions described in Examples 12 and 13. In the clear extender emulsions used in this example the ammonium lauryl alcohol sulfate is replaced by sodium lauryl sulfate, 30% active, technical grade. The other difference from Example 14 is the replacement of the water-soluble melamine resin by the clear extender emulsion in preparing the 1:4 cuts. This example as so far described, then illustrates a print paste which does not contain water-soluble melamine resin and does not contain a catalyst. A catalyst solution is prepared by dissolving ammonium tartarate in water to have approximately 30% concentration. A similar catalyst solution can be prepared by using 25 parts of tartaric acid, 25 parts of concentrated ammonia, and 50 parts of water. The ammonia should have sufficient strength to convert the tartaric acid to soluble ammonium tartarate.

Selected print pastes of Table 5 of Example 14, but modified as taught above in this Example 15, are printed on textiles without the use of catalyst and are referred to as Group "X." Another Group "Y" of print pastes are printed on textiles, the Group "Y" being identical to Group "X" except that the above catalyst solution is added in the proportion of 2 parts of catalyst solution to every 100 parts of print paste. Group "X" and Group "Y" prints were tested with regard to curing speed and a distinct advantage was found favoring the Group "Y" print pastes containing the catalyst.

*Example 16 (Print paste with added catalyst and water-soluble amino-aldehyde resin)*

To a print paste of Example 15, which contains the ammonium tartarate catalyst (Group "Y"), a water-soluble melamine resin solution of 60 percent non-volatile content is added in the proportion of 10 parts of melamine resin solution to every 100 parts of color concentrate which is present in the print paste, such modified paste being designated as a Group "Z" type. When the curing of Group "Z" is tested and compared with Group "X" and Group "Y", Group "Z" is found to be far superior and shows greatly enhanced curing speed. Further, the Group "Z" prints are readily adaptable for aging in vat agers and acid agers, without curing, and will yield with such after-processing excellent fastness properties to abrasive laundering.

*Example 17 (Print paste using resin-free color concentrate and single binder emulsion)*

In the first step of this example, a phthalocyanine blue pigment dispersion in water is prepared according to the method described in Example 3, with an ultimate pigment content of 17.48 weight percent. This pigment dispersion has a total non-volatile content of 23.45, and contains in addition to the pigment dispersing agents described in Example 3 about 17.33 weight parts of protective colloid for every 100 weight parts of dry pigment.

In the second step of this example a modified binder emulsion is prepared from the emulsion of Example 10 as follows: Into 1000 parts by weight of the product of Example 10, 1000 weight parts of mineral spirits is emulsified by adding the mineral spirits in increments, under agitation by a high speed enclosed turbine agitator. The modified binder emulsion of this example has a total weight of 2000 weight parts. This emulsion contains 17.80 percent non-volatile material.

In the third step of this example, the binder emulsion is mixed with the water dispersion of the phthalocyanine blue of this example in the proportion of 100 parts of blue dispersion and 400 parts of modified binder emulsion, yielding a total of 500 weight parts of a print paste, designated as 17–A.

In another modification of this example, 100 weight parts of blue dispersion are mixed with 390 parts of the modified binder emulsion and 10 parts of a water-soluble melamine-aldehyde resin, which has 60% non-volatile content, yielding a total of 500 weight parts of print paste, designated as 17–B.

In the first modification of this example (17–A): for each weight part of dry pigment there is present 0.630 weight parts of ester resins, 0.792 weight part of organic solvent-soluble amino-aldehyde resin, and 1.785 weight parts of elastomer. In the second modification of this example (17–B), there is present in the print paste for every one weight part of dry pigment 0.615 weight part ester resin, 0.7772 weight part of organic solvent-soluble aminoaldehyde resin, 1.740 weight parts of elastomer, and 0.343 weight part of water soluble melamine formaldehyde resin.

Both print pastes of this example yield, after curing, prints which show excellent resistance to abrasive laundering. However, the second modification (17–B) gives increased fastness when the after-treatment of the prints is made in an acid ager or a vat ager and not in a curing oven.

*Example 18 (Further concentrated binder emulsions)*

The product of Example 8 is prepared by varying in the binder non-volatile content the proportions of the three main ingredients as follows:

|  | Alternative I | Alternative II | Alternative III | Alternative IV |
|---|---|---|---|---|
| Ester resin | 22.56 | 32.20 | 28.37 | 19.77 |
| Organic solvent-soluble amino-aldehyde resin | 25.63 | 27.81 | 27.11 | 25.16 |
| Elastomer | 51.81 | 39.99 | 44.52 | 55.07 |
|  | 100.00 | 100.00 | 100.00 | 100.00 |

*Example 19 (Padding liquor)*

A mobile liquid padding liquor is prepared as follows:
5 weight parts of 1:4 weight cut of Violet prepared with clear extender emulsion of Example 13, as described in Example 14.
30 weight parts of clear extender emulsion of Example 13.
65 weight parts of water, totaling 100 weight parts.

This liquor is placed in the trough of a padder and an 80 x 80 cotton fabric is padded with it. 2 dips and 2 nips are applied in the padder and the pad dyed fabric is passed through a drying oven which has 200° F. temperature and is provided with proper air circulation. The dried fabric is then passed through a curing oven and heated for 3 minutes at 300° F.

*Example 20 (Color concentrate)*

A violet color concentrate is prepared in accordance with Example 4, with the change that the pigment content is lowered from 10.40 weight percents to 8.78 weight percents and the water content increased from 78.57 weight percents to 80.19 weight percents, leaving all other ingredients unchanged. For comparison purposes the print pastes of Examples 6–A, 6–B, 6–C, and 6–D and the print pastes of Examples 14–A, 14–B, 14–C, and 14–D are prepared, the latter in one case with clear extender emulsion of Example 12 and in the other case with clear extender emulsion of Example 13. After equal curing resistance to abrasive laundering is much greater with prints obtained from print pastes made in accordance with Example 14.

*Example 21 (Further print pastes with resin-free color concentrates)*

Example 17 is repeated with other pigments, changing in the first step the preparation of pigment dispersions, as follows:

21–A using phthalocyanine blue, yielding 19.3 weight percents pigment content in water dispersion;
21–B using vat violet as used in Example 4, yielding 10.4 weight percents pigment content in water dispersion;
21–C using cadmium yellow, yielding 55.35 weight percents pigment content in water dispersion;
21–D using phthalocyanine green, yielding 25.35 weight percent pigment content in water dispersion.

In all cases, 20.0 weight percents pigment dispersing surface active agents and 17.33 weight percents protective colloid was used, based on dry pigment content, as in Example 17, step I.

In the 1:4 cuts print pastes (20% pigment color concentrate-containing print pastes) for every one weight part of dry pigment the binder components were as follows:

|  | Ester resin | Organic solvent-soluble amino-aldehyde resin | Elastomer | Total binder N.V. |
|---|---|---|---|---|
| 21–A—Blue | 0.56 | 0.70 | 1.58 | 2.84 |
| 21–B—Violet | 1.03 | 1.30 | 2.93 | 5.26 |
| 21–C—Yellow | 0.19 | 0.24 | 0.55 | 0.98 |
| 21–D—Green | 0.42 | 0.53 | 1.20 | 2.15 |

When using for dilution the clear extender emulsion of Example 13, the binder resin components showed the following relationship:

|  | Ester Resin | Organic solvent-soluble amino-aldehyde resin | Elastomer | Total Binder N.V. | Water soluble amino-aldehyde resin |
|---|---|---|---|---|---|
| 1:4 cuts (20% pigment color concentrate in print paste) | 2.149 | 2.699 | 6.084 | 10.932 | 1.20 |
| 1:49 cuts (2% pigment color concentrate in print paste) | 0.881 | 1.098 | 2.516 | 4.495 | 0.120 |
| 1:99 cuts (1% pigment color concentrate in print paste) | 0.810 | 1.009 | 2.318 | 4.137 | 0.060 |
| 1:199 cuts (0.5% pigment color concentrate in print paste) | 0.775 | 0.964 | 2.219 | 3.958 | 0.030 |

In the print pastes of Examples 6, 14, 15, 16, and 20 pigment color concentrates were used which contain resin binders. In the print pastes of Examples 17 and 21 pigment color concentrates were used which are resin-free.

It is to be understood that the foregoing examples and embodiments of the invention are merely illustrative and are not to be considered as limiting the scope of the invention.

In connection with the use of added catalysts it may be stated that the quantity of catalyst varies depending on the catalyst used and other ingredients present in the print paste. In most cases the proper quantity may be found in the range of from about 0.1 weight percent to about 2 weight percent based on the total weight of the print paste.

What is claimed is:

1. An oil-in-water emulsion having the consistency of a textile printing paste which when admixed with dispersed pigment produces textile prints with improved resistance to abrasive laundering, in which emulsion the total non-volatile resin binder content of the oil-phase ranges from about 3.5 weight percent to about 14.5 weight percent based upon the total weight of the emulsion, said emulsion comprising as sole non-volatile resin binder components (i) a thermo-settable resinous ester of a polyhydric alcohol, which is at least trihydric, formed with a long chain unsaturated fatty acid, which resinous ester is a member of the group consisting of an ester of the reaction product of p′-p-dihydroxydiphenyldimethylmethane and epichlorhydrin, an oil-modified alkyd and a styrenated oil, (ii) an elastomer, and (iii) an organic solvent soluble thermo-setting amino-aldehyde resin selected from the group of melamine-formaldehyde and ureaformaldehyde resins, said amino-aldehyde resin being present in the percentage range of from about 18 weight percent to about 35 weight percent, the resinous ester ranging from about 17 weight percent to about 37 weight percent and the elastomer content ranging from about 37 weight percent to about 57 weight percent based upon the total weight of said non-volatile resin binder components, and said elastomer being at least one member of the group consisting of copolymers of acrylonitrile and butadiene, copolymers of styrene and butadiene, ternary copolymers of acrylonitrile and butadiene and styrene, polyvinyl chloride, copolymers of vinyl chloride and vinyl acetate, polyvinylidene chloride, copolymers of styrene and acrylonitrile, polychloroprene and polyisobutylene, said emulsion containing a hydrocarbon solvent.

2. An oil-in-water emulsion according to claim 1 in which the resinous ester content is from about 0.60 weight percent to about 3.55 weight percent, in which the elastomer content is from about 1.25 weight percent to about 6.30 weight percent and in which the amino-aldehyde resin content is from about 0.70 weight percent to about 3.45 weight percent, all percents being based upon the total weight of said emulsion.

3. An oil-in-water emulsion according to claim 1 in which in each 100 weight parts of the total non-volatile resin binder content the resinous ester content ranges from about 17 weight parts to about 37 weight parts, the elastomer content ranges from about 37 weight parts to about 57 weight parts and the organic solvent-soluble amino-aldehyde resin ranges from about 20 weight parts to about 31 weight parts.

4. An oil-in-water emulsion in admixture with dispersed pigment which admixture is a textile print paste suitable for application to print textiles and producing textile prints with improved resistance to abrasive laundering, in which emulsion the total non-volatile resin binder content of the oil-phase ranges from about 3.5 weight percent to about 14.5 weight percent based upon the total weight of the emulsion, said emulsion comprising as sole non-volatile resin binder components (i) a thermo-settable resinous ester of a polyhydric alcohol, which is at least trihydric, formed with a long chain unsaturated fatty acid, which resinous ester is a member of the group consisting of an ester of the reaction product of p′-p-dihydroxydiphenyldimethylmethane and epichlorhydrin, an oil-modified alkyd and a styrenated oil, (ii) an elastomer, and (iii) an organic solvent soluble thermo-setting amino-aldehyde resin selected from the group of melamine-formaldehyde and urea-formaldehyde resins, said amino-aldehyde resin being present in the percentage range of from about 18 weight percent to about 35 weight percent, the resinous ester ranging from about 17 weight percent to about 37 weight percent and the elastomer content ranging from about 37 weight percent to about 57 weight percent based upon the total weight of said non-volatile resin binder components, and said elastomer being at least one member of the group consisting of copolymers of acrylonitrile and butadiene, copolymers of styrene and butadiene, ternary copolymers of acrylonitrile and butadiene and styrene, polyvinyl chloride, copolymers of vinyl chloride and vinyl acetate, polyvinylidene chloride, copolymers of styrene and acrylonitrile, polychloroprene and polyisobutylene, said emulsion containing a hydrocarbon solvent, the total non-volatile binder resin content of said admixture being at least about 3.5% by weight based upon the total weight of the admixture.

5. A print paste according to claim 4, in which the dispersed elastomer is present in an organic solvent solution.

6. A print paste according to claim 4 comprising an organic pigment in a concentration of not less than about 2% by weight based on the weight of the total print paste and having a total resin binder non-volatile content ranging from about 7.5 weight percent to about 15 weight percent.

7. A print paste according to claim 4 in which the pigment is an inorganic pigment and in which for each one weight part of pigment the total non-volatile resin binder content of the print paste is at least about one weight part.

8. A print paste according to claim 4 in which the pigment is an organic pigment and in which for each one weight part of pigment the total non-volatile resin binder content of the print paste is at least about two weight parts.

9. A print paste according to claim 4 comprising an added catalyst for the thermo-setting reaction of the amino-aldehyde resin in the proportion of about 0.1 weight percent to about 2 weight percent, the percents being based on the total weight of the print paste.

10. A print paste according to claim 4 comprising an added catalyst for the thermo-setting reaction of the amino-aldehyde resin in the proportion of about 0.1 weight percent to about 2 weight percent, the percents being based on the total weight of the print paste, said added catalyst being a member of the class consisting of ammonium tartarate, ammonium glycolate, ammonium lactate, ammonium benzoate, ammonium formate, ammonium sulfate, ammonium nitrate, and ammonium phosphate, said print paste comprising ammonia and having a pH in excess of 7.

11. A print paste according to claim 4 in which there is additionally present a surface active agent which is an ammonium salt of an organic derivative of sulfuric acid, said surface active agent being a member of the class consisting of alkyl sulfates, aryl sulfonates, alkyl-arylsulfonates and sulfates and their derivatives, said surface active agent decomposing at elevated temperatures and the non-volatile decomposition product acting as a catalyst for the thermo-setting reaction of the amino-aldehyde resin.

12. A print paste according to claim 4 in which there is additionally present a surface active agent which is an ammonium salt of an organic derivative of sulfuric acid, said surface active agent being a fatty alcohol sulfate, said surface active agent decomposing at elevated temperatures and the non-volatile decomposition product acting as a catalyst for the thermo-setting reaction of the amino-aldehyde resin.

13. A print paste according to claim 4 in which there is additionally present a surface active agent which is an ammonium salt of lauryl alcohol sulfate.

14. A print paste according to claim 4 in which there is additionally present a minor quantity of water soluble amino-aldehyde resin in the proportion of from about 0.2 weight parts to about 1 weight part of non-volatile water soluble amino-aldehyde resin for each weight part of pigment present in the print paste.

15. A print paste according to claim 4 in which there is additionally present a minor quantity of water soluble amino-aldehyde resin in the proportion of from about 0.2 weight parts to about 1 weight part of non-volatile water soluble amino-aldehyde resin for each weight part of pigment present in the print paste, said water soluble amino-aldehyde resin being a water soluble polymer of a member of the class consisting of a trimethylol melamine and a hexamethylol melamine and their methyl and ethyl ethers.

16. A print paste according to claim 4 comprising a morpholine salt as an added catalyst for the thermo-setting reaction of the amino-aldehyde resin in the proportion of about 0.1 weight percent to about 2 weight percent, the percentages being based on the total weight of the print paste.

17. The process for producing decorated textiles with improved resistance to abrasive laundering wherein in the first step a pigment dispersion which contains dispersed pigment is mixed with a clear resin binder emulsion and a clear extender emulsion to produce a print paste, said paste comprising in the dispersed oil-phase as sole non-volatile resin binder components (i) a thermo-settable resinous ester of a polyhydric alcohol which is at least trihydric formed with a long chain unsaturated fatty acid, which resinous ester is a member of the group consisting of an ester of the reaction product of p'-p-dihydroxydiphenyldimethylmethane and epichlorhydrin, an oil-modified alkyd and a styrenated oil, (ii) an elastomer and (iii) an organic solvent-soluble thermo-setting amino-aldehyde resin selected from the group consisting of melamine-formaldehyde and urea-formaldehyde resins, said amino-aldehyde resin being present in the percentage range of from about 18% to about 35% by weight, the said resinous ester content ranging from about 17 weight percent to about 37 weight percent and the elastomer content ranging from about 37 weight percent to about 57 weight percent, based upon the total weight of said non-volatile resin binder components, said elastomer being at least one member of the group consisting of copolymers of acrylonitrile and butadiene, copolymers of styrene and butadiene, ternary copolymers of acrylonitrile and butadiene and styrene, polyvinyl chloride, copolymers of vinyl chloride and vinyl acetate, polyvinylidene chloride copolymers of styrene and acrylonitrile, polychloroprene and polyisobutylene, said print paste containing a hydrocarbon solvent, wherein in the second step a print is deposited on a textile fabric, the printed fabric is dried and after-treated at elevated temperatures to thermoset the decoration of said fabric.

18. An oil-in-water emulsion according to claim 1 in which the resinous ester is a styrenated alkyd.

References Cited in the file of this patent

UNITED STATES PATENTS

| | | |
|---|---|---|
| 2,383,937 | Kienle | Sept. 4, 1945 |
| 2,494,810 | Hobday et al. | Jan. 17, 1950 |
| 2,536,978 | Fordemwalt | Jan. 2, 1951 |
| 2,543,718 | Cassel et al. | Feb. 27, 1951 |
| 2,637,621 | Auer | May 5, 1953 |
| 2,637,705 | Auer | May 5, 1953 |
| 2,681,322 | Auer | June 15, 1954 |